(12) United States Patent
Xie et al.

(10) Patent No.: US 10,678,720 B2
(45) Date of Patent: Jun. 9, 2020

(54) METHOD AND SYSTEM FOR PROVIDING SOLUTION TO ADB PORT OCCUPANCY

(71) Applicant: FUJIAN LANDI COMMERCIAL EQUIPMENT CO., LTD., Fuzhou, Fujian (CN)

(72) Inventors: Yaohua Xie, Fujian (CN); Lijian Liu, Fujian (CN)

(73) Assignee: FUJIAN LANDI COMMERCIAL EQUIPMENT CO., LTD., Fuzhou (CN)

( * ) Notice: Subject to any disclaimer, the term of this patent is extended or adjusted under 35 U.S.C. 154(b) by 0 days.

(21) Appl. No.: 16/285,148

(22) Filed: Feb. 25, 2019

(65) Prior Publication Data

US 2019/0188167 A1 Jun. 20, 2019

Related U.S. Application Data

(63) Continuation of application No. PCT/CN2017/097845, filed on Aug. 17, 2017.

(30) Foreign Application Priority Data

Aug. 31, 2016 (CN) .......................... 2016 1 0785400

(51) Int. Cl.
*G06F 13/20* (2006.01)
*G06F 11/30* (2006.01)
*G06F 11/36* (2006.01)
*G06F 8/61* (2018.01)
*G06F 13/40* (2006.01)

(52) U.S. Cl.
CPC ................ *G06F 13/20* (2013.01); *G06F 8/61* (2013.01); *G06F 11/30* (2013.01); *G06F 11/3664* (2013.01); *G06F 13/4068* (2013.01)

(58) Field of Classification Search
CPC ...................................................... G06F 11/30
See application file for complete search history.

*Primary Examiner* — Henry Tsai
*Assistant Examiner* — Juanito Borromeo

(57) ABSTRACT

A method for providing a solution to ADB port occupancy includes: adding functional compound information to attribute information of an ADB device; setting descriptor information of the ADB device as preset descriptor information if VID and PID of the ADB device are consistent with preset VID and preset PID; the preset VID, the preset PID and a corresponding interface number are added to an ADB driver information file of a PC device; modifying a communication port number into a preset port number in an ADB communication program; installing a corresponding ADB driver if it is determined by the PC device that the VID, PID and interface number of the ADB device are consistent with the preset VID, the preset PID and the preset interface and that the descriptor information of the ADB device is the preset descriptor information; and setting the communication port number as the preset port number.

18 Claims, 3 Drawing Sheets

METHOD AND SYSTEM FOR PROVIDING SOLUTION TO ADB PORT OCCUPANCY

CROSS REFERENCE TO RELATED APPLICATIONS

The present application is a Continuation Application of PCT Application No. PCT/CN2017/097845 filed on Aug. 17, 2017, which claims the benefit of Chinese Patent Application No. 201610785400.7 filed on Aug. 31, 2016. All the above are hereby incorporated by reference.

TECHNICAL FIELD

The invention relates to the technical field of ADB, in particular to a method and system for providing a solution to ADB port occupancy.

DESCRIPTION OF RELATED ART

Previously, when ADB is used by Android developers or ADB tool users, the ADB communication port is usually, by default, occupied by various Android assistants (such as 91 assistant or 360 assistant) installed on computers after the computers are started, and consequentially, the ADB tools cannot be opened. In this case, the developers have to check one by one to determine which Android assistant occupies the ADB port and then close this application or forcibly stop the service using the ADB port, and thus, the development efficiency of the developers is severely affected.

TECHNICAL ISSUE

The technical issue to be settled by the invention is to provide a method and system for providing a solution to ADB port occupancy, so as to solve the problem of ADB tool port occupancy and to improve development efficiency.

Solution to the Technical Issue

Technical Solution

To settle the above technical issue, the technical solution adopted by the invention is to provide a method for providing a solution to ADB port occupancy. The method comprises the following steps: associating a vendor ID and a product ID of an ADB device with a preset interface number;

Adding functional compound information to attribute information of the ADB device, wherein the functional compound information includes the vendor ID and the product ID of the ADB device and the corresponding interface number;

Setting descriptor information of the ADB device as preset descriptor information if the vendor ID and the product ID of the ADB device are consistent with a preset vendor ID and a preset product ID;

Adding the preset vendor ID, the preset product ID and a corresponding interface number to an ADB driver information file of a PC device;

Modifying a communication port number into a preset port number in an ADB communication program of the PC device;

Connecting the ADB device to the PC device;

Installing a corresponding ADB driver by the PC device according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and Setting the communication port number between the PC device and the ADB device as the preset port number.

The invention further relates to a system for providing a solution to ADB port occupancy.

The System Comprises:

an association module used for associating a vendor ID and a product ID of an ADB device with a preset interface number;

a first adding module used for adding functional compound information to attribute information of the ADB device, wherein the functional compound information includes the vendor ID, the product ID of the ADB device and the corresponding interface number;

a first setting module used for setting descriptor information of the ADB device as preset descriptor information if the vendor ID and product ID of the ADB device are consistent with a preset vendor ID and a preset product ID;

a second adding module used for adding the preset vendor ID, the preset product ID and a corresponding interface number to an ADB driver information file of a PC device while the first setting module is executed;

a modification module used for modifying a communication port number into a preset port number in an ADB communication program of the PC device;

a connection module used for connecting the ADB device to the PC device;

an installation module used for installing a corresponding ADB driver according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and a second setting module used for setting the communication port between the PC device and the ADB device as the preset communication port while the installation module is executed.

BENEFICIAL EFFECTS OF THE INVENTION

Beneficial Effects

The invention has the following beneficial effects: The vendor ID and the product ID (VID and PID) and the corresponding interface number are added to the attribute information of the ADB device, and the descriptor information of the ADB device is redefined if the vendor ID and the product ID of the ADB device are consistent with the preset vendor ID and the preset product ID, so that the original standard ADB device is distinguished from a customized ADB device when the PC device matches with the driver; the preset vendor ID, the preset product ID and the corresponding interface number are added to the ADB driver information file of the PC device to generate a customized ADB driver, and the corresponding customized ADB driver is installed when it is determined by the PC device that the ADB device connected with the PC device is a customized ADB device; and meanwhile, the communication port number is modified into the preset port number in the ADB communication program of the PC device, and a port number inconsistent with the standard ADB communication port number 5037 is used for communication with the PC device after the ADB device is connected to the PC device, so that the default standard port is prevented from being occupied by assistants.

BRIEF DESCRIPTION OF THE DRAWINGS

Brief Description of the Several Views of the Drawings

Figure 1:
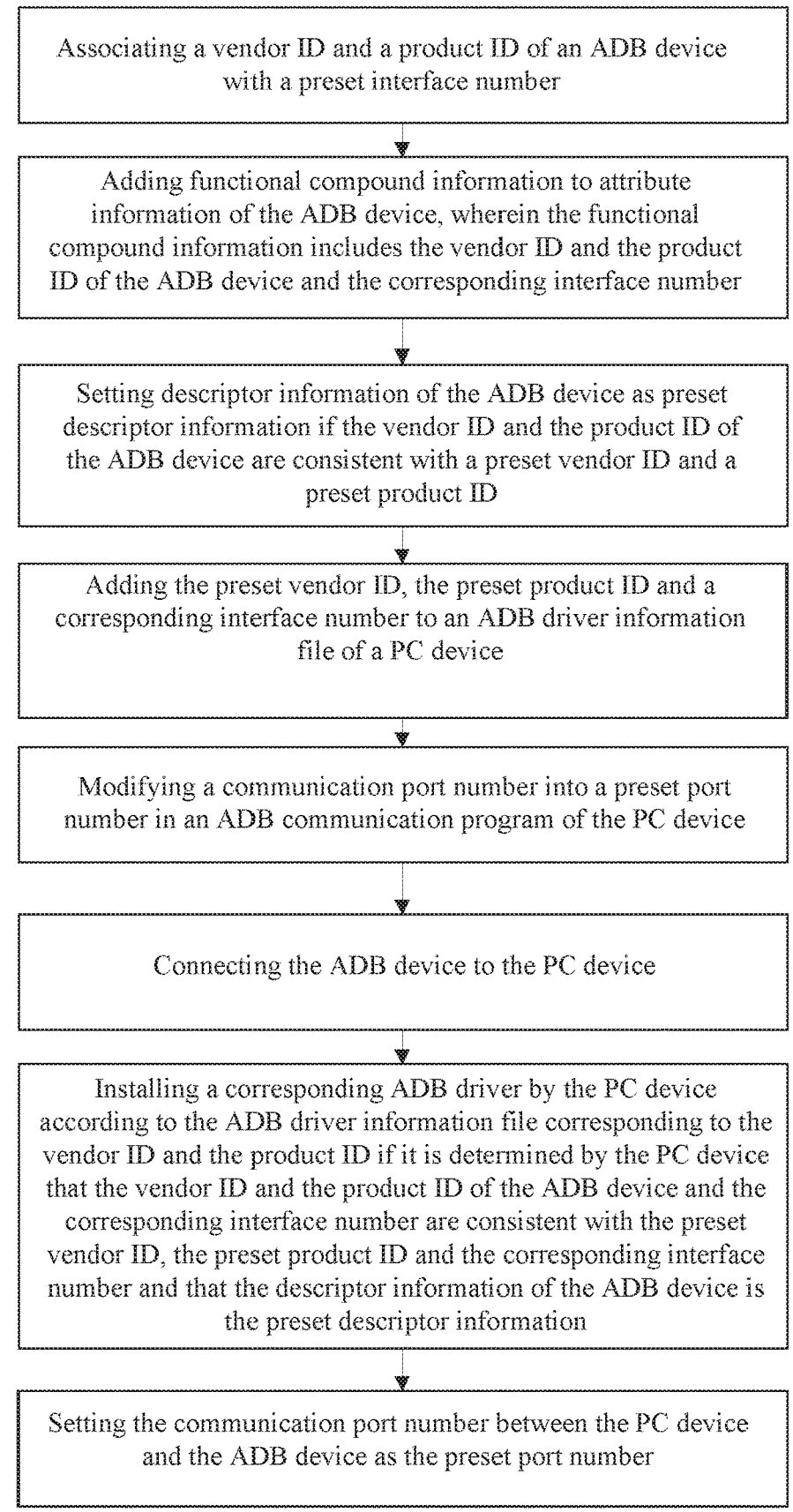
Figure 2:
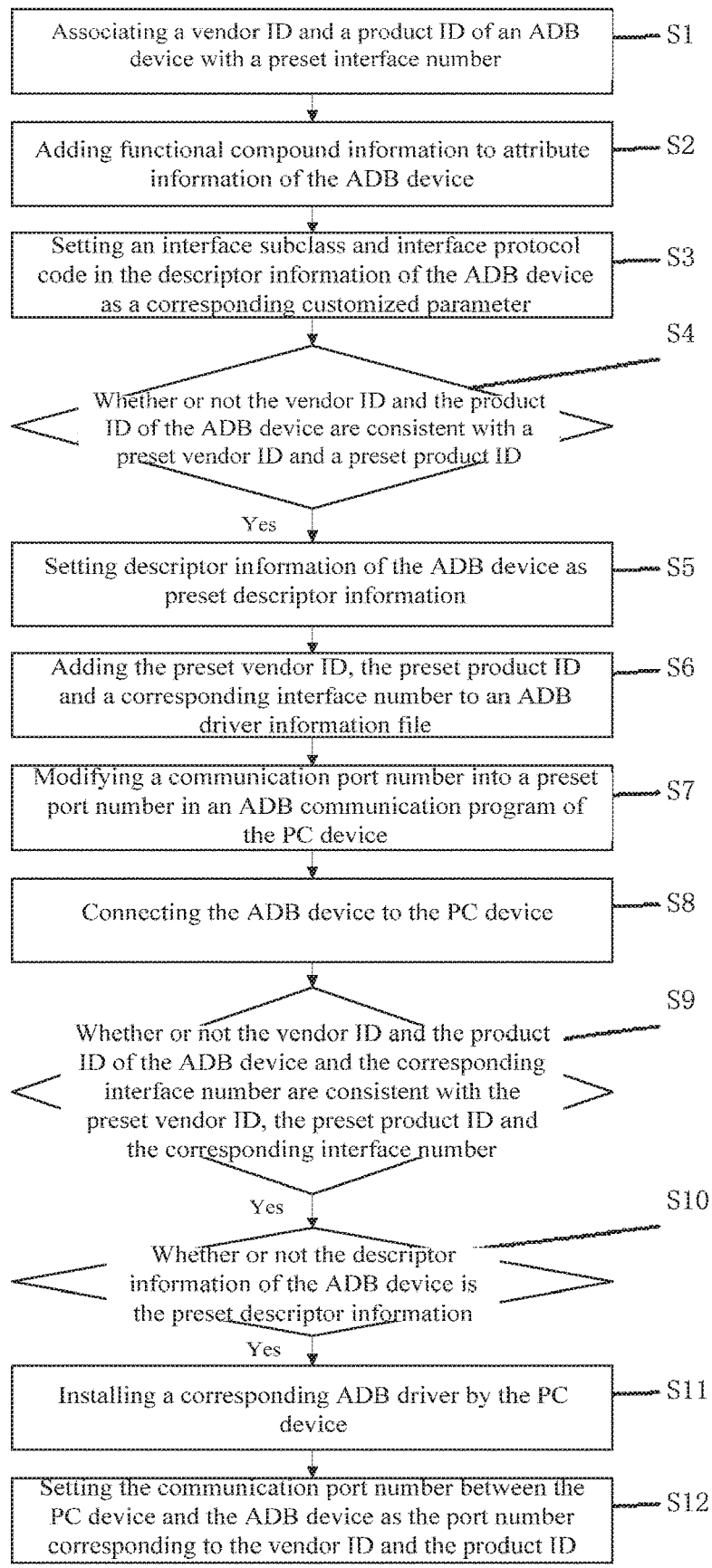
Figure 3:
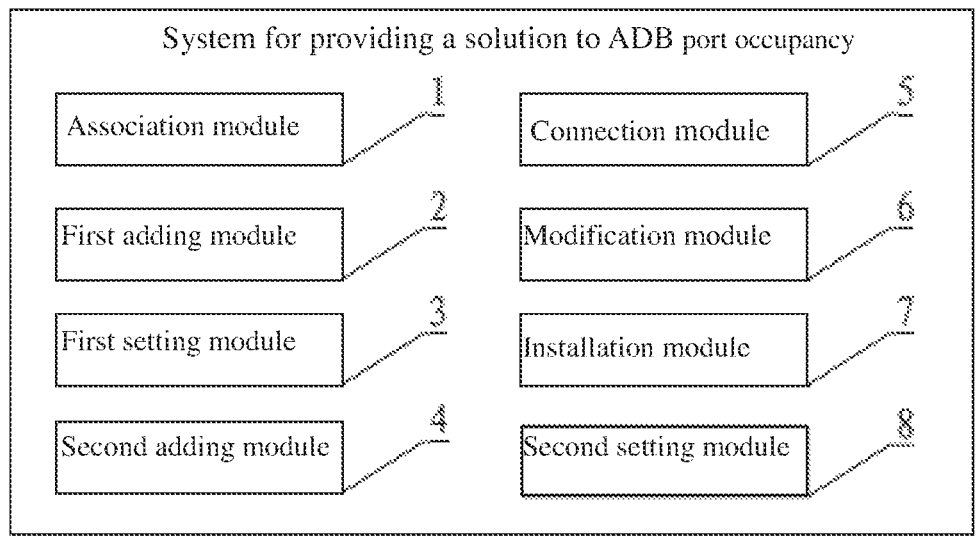
Figure 4:
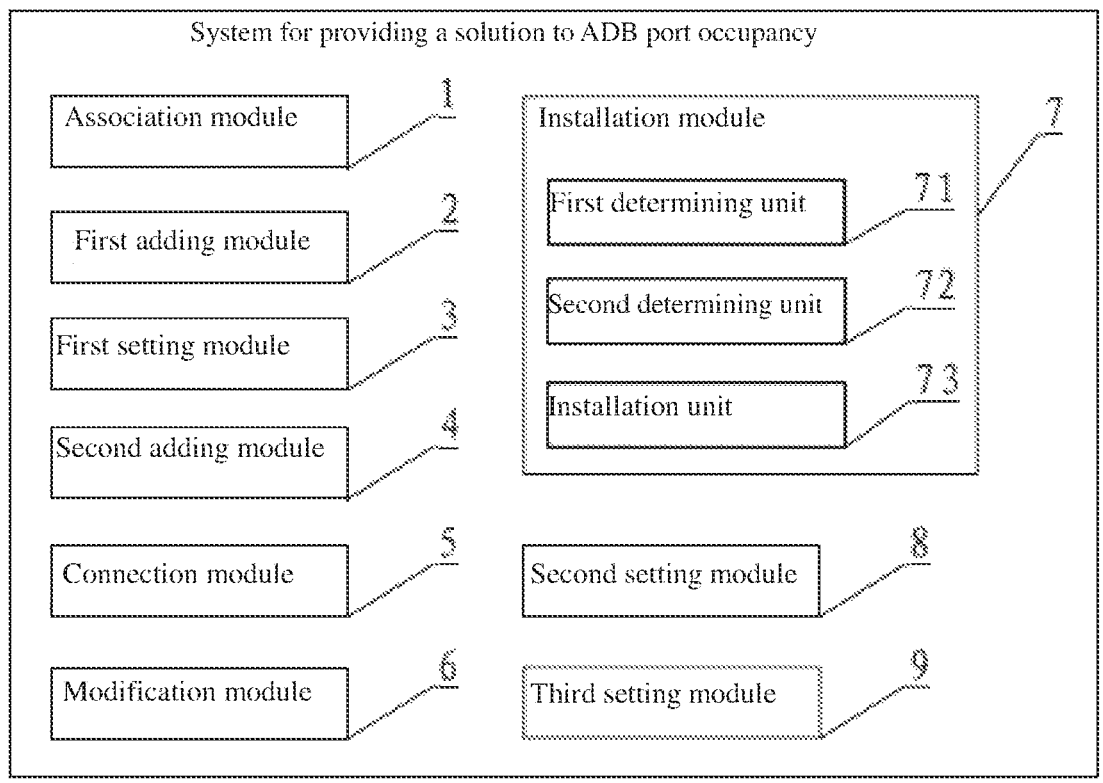

FIG. 1 is a flow diagram of a method for providing a solution to ADB port occupancy of the invention;

FIG. 2 is a flow diagram of embodiment 1 of the invention;

FIG. 3 is a structural view of a system for providing a solution to ADB port occupancy of the invention;

FIG. 4 is a structural view of embodiment 2 of the invention.

REFERENCE SIGNS 1, association module; 2, first adding module; 3, first setting module; 4, second adding module; 5, connection module; 6, modification module; 7, installation module; 8, second setting module; 9, third setting module; 71, first determining unit; 72, second determining unit; 73, installation unit.

Embodiments of the Invention

DETAILED DESCRIPTION OF THE INVENTION

The key conception of the invention is that a vendor ID, a product ID and a corresponding interface number are added to attribute information of an ADB device and an ADB driver information file of a PC device, so that a standard ADB driver is prevented from being installed on the PC device, and a nonstandard port is used for communication.

Referring to FIG. 1, a method for providing a solution to ADB port occupancy comprises the following steps:

Associating a vendor ID and a product ID of an ADB device with a preset interface number;

Adding functional compound information to attribute information of the ADB device, wherein the functional compound information includes the vendor ID and the product ID of the ADB device and the corresponding interface number;

Setting descriptor information of the ADB device as preset descriptor information if the vendor ID and the product ID of the ADB device are consistent with a preset vendor ID and a preset product ID;

Adding the preset vendor ID, the preset product ID and the corresponding interface number to an ADB driver information file of a PC device;

Modifying a communication port number into a preset port number in an ADB communication program of the PC device;

Connecting the ADB device to the PC device;

Installing a corresponding ADB driver by the PC device according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and Setting the communication port number of the PC device and the ADB device as the preset port number.

As can be seen from the above description, the invention has the following beneficial effects: a solution to ADB tool port occupancy is provided, and the development efficiency is improved.

Furthermore, the method further comprises, prior to the step 'setting the descriptor information of the ADB device as the preset descriptor information', the following step:

Setting an interface subclass and interface protocol code in the descriptor information of the ADB device as a corresponding customized parameter.

As can be seen from the above description, the descriptor information of the ADB device is redefined to distinguish a standard ADB device from a customized ADB device when the PC device is matched with the device driver.

Furthermore, the step 'installing the corresponding ADB driver by the PC device according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information' particularly comprises the following sub-steps:

Determining, by the PC device, whether or not the vendor ID and the product ID of the ADB device and the corresponding interface number are consistent with the preset vendor ID, the preset product ID and the corresponding interface number;

If yes, determining whether or not the descriptor information of the ADB device is the preset descriptor information;

If yes, installing the corresponding ADB driver by the PC device according to the ADB driver information file corresponding to the vendor ID and the product ID.

As can be seen from the above description, whether or not the vendor ID and the product ID of the ADB device and the corresponding interface number are consistent with the preset vendor ID, the preset product ID and the corresponding interface number is determined by the PC device to judge whether or not the ADB device is a customized ADB device, and then, the customized ADB driver is installed for the customized ADB device.

Furthermore, the preset port number is a nonstandard port number.

Furthermore, the ADB device is an intelligent terminal provided with an embedded system and a USB compound device having an ADB function, and the PC device is a computer equipped with a Windows system.

Referring to FIG. 3, the invention further provides a system for providing a solution to ADB port occupancy. The system comprises:

an association module used for associating a vendor ID and a product ID of an ADB device with a preset interface number;

a first adding module used for adding functional compound information to attribute information of the ADB device, wherein the functional compound information includes the vendor ID, the product ID of the ADB device and the corresponding interface number;

a first setting module used for setting descriptor information of the ADB device as preset descriptor information if the vendor ID and product ID of the ADB device are consistent with a preset vendor ID and a preset product ID;

a second adding module used for adding the preset vendor ID, the preset product ID and a corresponding interface number to an ADB driver information file of a PC device after the first setting module is executed;

a modification module used for modifying a communication port number into a preset port number in an ADB communication program of the PC device;

a connection module used for connecting the ADB device to the PC device;

an installation module used for installing a corresponding ADB driver according to the ADB driver information file corresponding vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and a second setting module used for setting the communication port number of the PC device and the ADB device as the preset communication port number while the installation module is executed.

Furthermore, the system further comprises:

a third setting module used for setting an interface subclass and interface protocol code in the descriptor information of the ADB device as a corresponding customized parameter.

Furthermore, the installation module comprises:

a first determining unit used for determining whether or not the vendor ID and the product ID of the ADB device and the corresponding interface number are consistent with the preset vendor ID, the preset product ID and the corresponding interface number;

a second determining unit used for determining whether or not the descriptor information of the ADB device is the preset descriptor information if the vendor ID and the product ID of the ADB device and the corresponding interface number are consistent with the preset vendor ID, the preset product ID and the corresponding interface number; and an installation unit used for installing the corresponding ADB driver according to the ADB driver information file corresponding to the vendor ID and the product ID of the PC device if the descriptor information of the ADB device is the preset descriptor information.

Furthermore, the preset port number is a nonstandard port number.

Furthermore, the ADB device is an intelligent terminal provided with an embedded system and a USB compound device having an ADB function, and the PC device is a computer equipped with a Windows system.

Embodiment 1

Embodiment 1: referring to FIG. 2, a method for providing a solution to ADB port occupancy is applicable to device manufacturers and developers, developers of third application parties or other personnel needing ADB tools and comprises the following steps:

S1, a vendor ID and a product ID of an ADB device are associated with a preset interface number, namely, the preset interface number is associated with the vendor ID and the product ID at the same time, wherein the vendor ID is called VID for short, the product ID is called PID for short, and the interface number corresponding to an interface function such as an ADB function;

S2, functional compound information is added to attribute information of the ADB device, wherein the functional compound information includes the vendor ID and the product ID of the ADB device and the corresponding interface number;

S3, an interface subclass and interface protocol code in descriptor information of the ADB device is set as a corresponding customized parameter, namely, the interface subclass and interface protocol code is set as 0xff, and the interface class is still ADB_CLASS, so that an ADB device driver will still be installed on a PC device;

S4, whether or not the vendor ID and the product ID of the ADB device are consistent with a preset vendor ID and a preset product ID is determined; if yes, step S5 is executed;

S5, the descriptor information of the ADB device is set as preset descriptor information, for instance, if original descriptors of the ADB device are system default descriptors, preset descriptors such as descriptors2 are used for configuration in this step, and the ADB device a customized ADB device after the descriptor information is modified;

S6, the preset vendor ID, the preset product ID and a corresponding interface number are added to an ADB driver information file of the PC device, namely, the preset VID, the preset PID and the corresponding interface number are added to an adb_CLASS inf file in the PC driver to generate an ADB driver corresponding to the vendor ID and the product ID;

S7, a communication port number is modified into a preset port number in an ADB communication program of the PC device, wherein the ADB communication program is an adb.exe tool; furthermore, the preset port number is a nonstandard port number, namely, the preset port number can be any port numbers except a default standard port number, for instance, if the default standard port number is 5037, the preset port number can be 5039 or the like;

S8, the ADB device is connected to the PC device;

S9, the PC device determines whether or not the vendor ID and the product ID of the ADB device and the corresponding interface number are consistent with the preset vendor ID, the preset product ID and the corresponding interface number; if yes, step S10 is executed;

S10, whether or not the descriptor information of the ADB device is the preset descriptor information is determined, namely, whether or not the ADB device is a customized device is determined; if yes, step S11 is executed to S11, the corresponding ADB driver is installed by the PC device according to the ADB driver information file corresponding to the vendor ID and the product ID, namely, a corresponding customized ADB driver is installed for a customized ADB device;

S12, the communication port number of the PC device and the ADB device is set as the preset port number while step S11 is executed, namely, the communication port number between the PC device and the ADB device is set as any port numbers except the standard ADB communication number 5037;

Wherein, common ADB devices can be intelligent terminals provided with an embedded system (such as Linux, Android and Ubuntu) and a USB compound device having an ADB function, such as mobile phones and tablet computers. In this embodiment, the ADB device is a terminal device equipped with the Android system, and the PC device is a computer equipped with the Windows system.

Wherein, in step S2, because the Android system can match a corresponding identical attribute value of a file init.usb.rc through the value, such as mtp and adb, of an attribute file persist.sys.usb.config, and the rc file specifies PID and VID after matching, which means that the PC system is used for driver matching. On this basis, the functional compound information is added to the file init.usb.rc, and PID and IID of a USB device and interface numbers corresponding to different functions are added to the foundational compound information; and meanwhile, the default value of the attribute file persist.sys.usb.config of the Android system is modified for matching.

In step S3, the interface descriptor information of the ADB device can be set as the following codes:

```
fs_descs ={
.intf={
.bLength =sizeof(descriptors2.fs_descs.intf),
.bDescriptorType=USB_DT_INTERFACE,
.bInterfaceNumber =0,
.bNumEndpoints =2,
.bInterfaceClass=ADB_CLASS
.bInterfaceSubClass=0xff,
.bInterfaceProtocol=0xff,
.iInterface =1,/* first string from the provided table */
};
```

Step S4 and step S5 can be implemented by adding the following codes to init_functionfs( ):

```
if((strcmp(usbname,nmtp,epay,epay_dln)==0)ll(strcmp(usbname,nptp,epay,epay_dln)
==0)ll(strcmp(usbname,nmass_storage,epay,epay_dln)==0)ll(strcmp(usbname,nrndis,ep ay,
epay_dl")==0))
ret=adb_write(h->control, &descriptors2, sizeof(descriptors2));
```

In this embodiment, the vendor ID and the product ID (VID and PID) and the corresponding interface number are added to the attribute information of the ADB device, and the descriptor information of the ADB device is redefined if the vendor ID and the product ID of the ADB device are consistent with the preset vendor ID and the preset product ID, so that the original standard ADB device is distinguished from a customized ADB device when the PC device matches with the driver; the preset vendor ID, the preset product ID and the corresponding interface number are added to the ADB driver information file of the PC device to generate a customized ADB driver, and the corresponding customized ADB driver is installed when it is determined by the PC device that the ADB device connected with the PC device is a customized ADB device; and meanwhile, the communication port number is modified into the preset port number in the ADB communication program of the PC device, and a port number inconsistent with the standard ADB communication port number 5037 is used for communication with the PC device after the ADB device is connected to the PC device, so that the default standard port is prevented from being occupied by assistants.

Embodiment 2

Referring to FIG. 4, a system for providing a solution to ADB port occupancy corresponds to the method in embodiment 1 and comprises:

an association module 1 used for associating a vendor ID and a product ID of an ADB device with a preset interface number;

a first adding module 2 used for adding functional compound information to attribute information of the ADB device, wherein the functional compound information includes the vendor ID and the product ID of the ADB device and the corresponding interface number;

a first setting module 3 used for setting descriptor information of the ADB device as preset descriptor information if the vendor ID and product ID of the ADB device are consistent with a preset vendor ID and a preset product ID;

a second adding module 4 used for adding the preset vendor ID, the preset product ID and a corresponding interface number to an ADB driver information file of a PC device after the first setting module 3 is executed;

a modification module 5 used for modifying a communication port number into a preset port number in an ADB communication program of the PC device;

a connection module 6 used for connecting the ADB device to the PC device;

an installation module 7 used for installing a corresponding ADB driver according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and a second setting module 8 used for setting the communication port number between the PC device and the ADB device as the preset communication port number while the installation module 7 is executed.

The system further comprises:

a third setting module 9 used for setting an interface subclass and interface protocol code in the descriptor information of the ADB device as a corresponding customized parameter.

The installation module 7 comprises:

a first determining unit 71 used for determining whether or not the vendor ID and the product ID of the ADB device and the corresponding interface number are consistent with the preset vendor ID, the preset product ID and the corresponding interface number;

a second determining unit 72 used for determining whether or not the descriptor information of the ADB device is the preset descriptor information if the vendor ID and the product ID of the ADB device and the corresponding interface number are consistent with the preset vendor ID, the preset product ID and the corresponding interface number; and an installation unit 73 used for installing the corresponding ADB driver according to the ADB driver information file corresponding to the vendor ID and the product ID of the PC device if the descriptor information of the ADB device is the preset descriptor information.

The preset port number is a nonstandard port number.

The ADB device is an intelligent terminal provided with an embedded system and a USB compound device having an ADB function.

The PC device is a computer equipped with a Windows system

According to the method and system for providing a solution to ADB port occupancy, the vendor ID and the product ID (VID and PID) and the corresponding interface number are added to the attribute information of the ADB device, and the descriptor information of the ADB device is redefined if the vendor ID and the product ID of the ADB device are consistent with the preset vendor ID and the preset product ID, so that the original standard ADB device is distinguished from a customized ADB device when the PC device matches with the driver; the preset vendor ID, the preset product ID and the corresponding interface number are added to the ADB driver information file of the PC device to generate a customized ADB driver, and the corresponding customized ADB driver is installed when it is determined by the PC device that the ADB device connected with the PC device is a customized ADB device; and meanwhile, the communication port number is modified into the preset port number in the ADB communication program of the PC device, and a port number inconsistent with the standard ADB communication port number 5037 is used for communication with the PC device after the ADB device is connected to the PC device, so that the default standard port is prevented from being occupied by assistants.

The invention claimed is:

1. A method for providing a solution to Android Debug Bridge ADB port occupancy, comprising: associating a vendor ID and a product ID of an ADB device with a preset interface number; adding functional compound information to attribute information of the ADB device, wherein the functional compound information includes the vendor ID and the product ID of the ADB device and the corresponding interface number; setting descriptor information of the ADB device as preset descriptor information if the vendor ID and the product ID of the ADB device are consistent with a preset vendor ID and a preset product ID; adding the preset vendor ID, the preset product ID and a corresponding interface number to an ADB driver information file of a PC device; modifying a communication port number into a preset port number in an ADB communication program of the PC device; connecting the ADB device to the PC device; installing a corresponding ADB driver by the PC device according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and setting the communication port number between the PC device and the ADB device as the preset port number.

2. The method for providing a solution to ADB port occupancy according to claim 1, wherein prior to the step 'setting the descriptor information of the ADB device as the preset descriptor information', the method further comprises:
setting an interface subclass and interface protocol code in the descriptor information of the ADB device as a corresponding customized parameter.

3. The method for providing a solution to ADB port occupancy according to claim 1, wherein the step 'installing the corresponding ADB driver by the PC device according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information' particularly comprises:
determining, by the PC device, whether or not the vendor ID and the product ID of the ADB device and the corresponding interface number are consistent with the preset vendor ID, the preset product ID and the corresponding interface number;
if yes, determining whether or not the descriptor information of the ADB device is the preset descriptor information; and
if yes, installing the corresponding ADB driver by the PC device according to the ADB driver information file corresponding to the vendor ID and the product ID.

4. The method for providing a solution to ADB port occupancy according to claim 1, wherein the preset port number is a nonstandard port number.

5. The method for providing a solution to ADB port occupancy according to claim 2, wherein the preset port number is a nonstandard port number.

6. The method for providing a solution to ADB port occupancy according to claim 3, wherein the preset port number is a nonstandard port number.

7. The method for providing a solution to ADB port occupancy according to claim 1, wherein the ADB device is an intelligent terminal provided with an embedded system and a USB compound device having an ADB function, and the PC device is a computer equipped with a Windows system.

8. The method for providing a solution to ADB port occupancy according to claim 2, wherein the ADB device is an intelligent terminal provided with an embedded system and a USB compound device having an ADB function, and the PC device is a computer equipped with a Windows system.

9. The method for providing a solution to ADB port occupancy according to claim 3, wherein the ADB device is an intelligent terminal provided with an embedded system and a USB compound device having an ADB function, and the PC device is a computer equipped with a Windows system.

10. A system for providing a solution to Android Debug Bridge ADB port occupancy, comprising: an association module used for associating a vendor ID and a product ID of an ADB device with a preset interface number; a first adding module used for adding functional compound information to attribute information of the ADB device, wherein the functional compound information includes the vendor ID, the product ID of the ADB device and the corresponding interface number; a first setting module used for setting descriptor information of the ADB device as preset descriptor information if the vendor ID and product ID of the ADB device are consistent with a preset vendor ID and a preset product ID; a second adding module used for adding the preset vendor ID, the preset product ID and a corresponding interface number to an ADB driver information file of a PC device after the first setting module is executed; a modification module used for modifying a communication port number into a preset port number in an ADB communication program of the PC device; a connection module used for connecting the ADB device to the PC device; an installation module used for installing a corresponding ADB driver according to the ADB driver information file corresponding to the vendor ID and the product ID if it is determined by the PC device that the vendor ID and the product ID of the ADB device and the corresponding interface number are consistent with the preset vendor ID, the preset product ID and the corresponding interface number and that the descriptor information of the ADB device is the preset descriptor information; and a second setting module used for setting the communication port between the PC device and the ADB device as the preset communication port while the installation module is executed.

11. A system for providing a solution to ADB port occupancy according to claim 10, wherein the system further comprises:
   a third setting module used for setting an interface subclass and interface protocol code in the descriptor information of the ADB device as a corresponding customized parameter.

12. The system for providing a solution to ADB port occupancy according to claim 10, wherein the installation module comprises:
   a first determining unit used for determining whether or not the vendor ID and the product ID of the ADB device and the corresponding interface number are consistent with the preset vendor ID, the preset product ID and the corresponding interface number;
   a second determining unit used for determining whether or not the descriptor information of the ADB device is the preset descriptor information if the vendor ID and the product ID of the ADB device and the corresponding interface number are consistent with the preset vendor ID, the preset product ID and the corresponding interface number; and
   an installation unit used for installing the corresponding ADB driver according to the ADB driver information file corresponding to the vendor ID and the product ID of the PC device if the descriptor information of the ADB device is the preset descriptor information.

13. The system for providing a solution to ADB port occupancy according to claim 10, wherein the preset port number is a nonstandard port number.

14. The system for providing a solution to ADB port occupancy according to claim 11, wherein the preset port number is a nonstandard port number.

15. The system for providing a solution to ADB port occupancy according to claim 12, wherein the preset port number is a nonstandard port number.

16. The system for providing a solution to ADB port occupancy according to claim 10, wherein the ADB device is an intelligent terminal provided with an embedded system and a USB compound device having an ADB function, and the PC device is a computer equipped with a Windows system.

17. The system for providing a solution to ADB port occupancy according to claim 11, wherein the ADB device is an intelligent terminal provided with an embedded system and a USB compound device having an ADB function, and the PC device is a computer equipped with a Windows system.

18. The system for providing a solution to ADB port occupancy according to claim 12, wherein the ADB device is an intelligent terminal provided with an embedded system and a USB compound device having an ADB function, and the PC device is a computer equipped with a Windows system.

* * * * *